United States Patent
Tseng et al.

(10) Patent No.: US 8,311,680 B2
(45) Date of Patent: Nov. 13, 2012

(54) METHOD OF DETERMINING DEMAND THRESHOLD, AND METHOD AND SYSTEM OF DEMAND CONTROL

(75) Inventors: Wen-Hsiang Tseng, Pingtung County (TW); Cheng-Ting Lin, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 279 days.

(21) Appl. No.: 12/539,761

(22) Filed: Aug. 12, 2009

(65) Prior Publication Data
US 2010/0168929 A1   Jul. 1, 2010

(30) Foreign Application Priority Data
Dec. 26, 2008   (TW) ................ 97151104 A

(51) Int. Cl.
G05B 15/00 (2006.01)
G05B 11/01 (2006.01)
G04F 1/00 (2006.01)
G05D 17/00 (2006.01)
G06F 7/00 (2006.01)

(52) U.S. Cl. .......... 700/295; 700/22; 700/291; 700/297; 702/57; 702/176; 708/207

(58) Field of Classification Search ............... 700/291, 700/295, 297, 22, 90; 123/350, 359; 434/430; 706/16; 708/207; 702/57, 61, 127, 176, 702/186; 705/7.11, 7.25
See application file for complete search history.

(56) References Cited

U.S. PATENT DOCUMENTS

| | | | | |
|---|---|---|---|---|
| 3,652,838 A | * | 3/1972 | Dillon et al. | 700/295 |
| 4,583,182 A | * | 4/1986 | Breddan | 700/291 |
| 4,855,922 A | * | 8/1989 | Huddleston et al. | 700/295 |
| RE36,360 E | * | 10/1999 | Costanza | 705/7.25 |
| 6,115,676 A | * | 9/2000 | Rector et al. | 702/62 |
| 6,758,655 B2 | * | 7/2004 | Sacher | 417/19 |
| 7,200,579 B2 | * | 4/2007 | Zhang et al. | 705/400 |
| 7,403,928 B2 | * | 7/2008 | Chen | 706/15 |
| 7,480,623 B1 | | 1/2009 | Landvater | |
| 2002/0163431 A1 | * | 11/2002 | Nakajima et al. | 340/540 |
| 2004/0254688 A1 | * | 12/2004 | Chassin et al. | 700/295 |
| 2007/0293958 A1 | | 12/2007 | Stehle et al. | |
| 2008/0103614 A1 | | 5/2008 | Ellison et al. | |
| 2008/0195237 A1 | | 8/2008 | Mukaigawa et al. | |

(Continued)

FOREIGN PATENT DOCUMENTS

EP   178067 A1 * 4/1986

(Continued)

OTHER PUBLICATIONS

Paliwar, Veena Keshay. "Economic Environment of Business". New Delhi: PHI Learning Private Limited. 2008.*

(Continued)

*Primary Examiner* — Mohammad Ali
*Assistant Examiner* — Jennifer L Norton
(74) *Attorney, Agent, or Firm* — McClure, Qualey & Rodack LLP

(57) ABSTRACT

A method of setting a demand threshold is provided. A control unit arranges a plurality of demand data in a descending or an ascending order as a curve. The control unit connects a maximum demand datum and a minimum demand datum with a line. The control unit sets a demand datum with a longest perpendicular distance to the line as a demand threshold.

6 Claims, 2 Drawing Sheets

U.S. PATENT DOCUMENTS

| | | | |
|---|---|---|---|
| 2009/0144122 A1 | 6/2009 | Ginsberg et al. | |
| 2009/0319172 A1 | 12/2009 | Almeida et al. | |
| 2012/0092711 A1* | 4/2012 | Hosoda | 358/1.15 |
| 2012/0166001 A1* | 6/2012 | Park et al. | 700/287 |
| 2012/0221162 A1* | 8/2012 | Forbes, Jr. | 700/295 |

FOREIGN PATENT DOCUMENTS

| | | |
|---|---|---|
| JP | 55-047554 | 4/1980 |
| JP | 03-015229 | 1/1991 |
| JP | 2004-192425 | 7/2004 |
| JP | 2005-344952 | 12/2005 |
| JP | 2006-115699 | 4/2006 |
| JP | 2006-178886 | 7/2006 |
| JP | 2007-202277 | 8/2007 |
| JP | 2007-209081 | 8/2007 |

OTHER PUBLICATIONS

English language translation of JP 2004-192425 (published Jul. 8, 2004).

English language translation of JP 2005-344952 (published Dec. 15, 2005).

English language translation of JP 2006-178886 (published Jul. 6, 2006).

English language translation of abstract of JP 55-047554 (published Apr. 4, 1980).

English language translation of abstract of JP 03-015229 (published Jan. 23, 1991).

English language translation of abstract of JP 2007-202277 (published Aug. 9, 2007).

English language translation of abstract of JP 2007-209081 (published Aug. 16, 2007).

Non-Final Office Action dated Feb. 16, 2012, Issued in U.S. Appl. No. 12/578,985.

English language translation of Abstract of JP55-047554 (published Apr. 4, 1980).

English language translation of Abstract of JP03-015229 (published Jan. 23, 1991).

English language translation of Application No. JP2006-115699 (published Apr. 26, 2006).

English language translation of Abstract of JP2007-202277 (published Aug. 9, 2007).

English language translation of Abstract of JP2007-209081 (published Aug. 16, 2007).

English language translation of Office Action in related Japanese Application No. 2009-254935, (Dispatch Date Jul. 19, 2011).

Office Action in related Japanese Application No. 2009-254935, (Dispatch Date Jul. 19, 2011).

English language translation of Application No. JP2004-192425 (published Jul. 8, 2004).

English language translation of Application No. JP2005-344952 (published Dec. 15, 2005).

English language translation of Application No. JP2006-178886 (published Jul. 6, 2006).

Office Action issued on Jul. 5, 2012, in U.S. Appl. No. 12/578,985.

English language translation of JP2004-192425 (published Jul. 8, 2004).

* cited by examiner

METHOD OF DETERMINING DEMAND THRESHOLD, AND METHOD AND SYSTEM OF DEMAND CONTROL

This application claims the benefit of Taiwan application Serial No. 97151104, filed Dec. 26, 2008, the subject matter of which is incorporated herein by reference.

BACKGROUND OF THE INVENTION

1. Field of the Invention

The invention relates in general to a control method and a system thereof, and more particularly to a method of calculating a demand threshold, and a method and a system of demand control.

2. Description of the Related Art

Although a convenient store only occupies small area, its energy consumption index is higher than that of a department store or a supermarket. As energy saving consciousness is getting higher, it is very important to design an effective and adequate energy saving system to control the electricity consumption of the convenient store.

The convenient store is the place to provide service for customers. While putting energy saving solutions into practice, it should be considered if the store operation is affected. In the store management system revealed in Japanese Patent No. JP2006178886, an integrated system combining a POS and a store management platform is provided. The system integrates remote access with energy saving countermeasures which controls electric equipment such as air conditioning and illuminating apparatus. However, the cost to set up these systems is too expensive, which results in a long period of time to recover the cost. Furthermore, the system is too complicated. As a result, the related hardware cost and the software design expense cannot be lowered, which significantly reduces the practicability.

Moreover, in the in-store equipment remote monitoring system revealed in US Patent No. 2002163431, a monitoring system is provided to collect the parameters such as indoor and outdoor illumination, the refrigerator temperature, outdoor temperature, the frequency of the automatic door, etc. The system predicts the next day's weather and brightness according to the historical information of the parameters, and calculates the suggested indoor illumination levels and temperature of air-conditioning with reference to the weather forecast. The user can manually adjust the operation of the equipment according to the suggested parameters. However, the cost to build up the system is too expensive. The system is complicated, which results in high related hardware cost and software design expense. The system cannot adjust the operation of the equipment automatically. When the environmental conditions change frequently and affect the decisions, the clerk has to take care of the customers and adjusts the equipment manually, which lowers the practicality greatly. Therefore, it is necessary to develop an automatic and effective energy saving strategy.

The electric fees of Taiwan Power Company include demand charge, energy charge and penalty charge. The store usually signs a contract with the power company to obtain electricity with lower rates. However, it s stipulated in the contract that the power consumption amount cannot exceed the contracted amount in each period of time in a month. For example, the power consumption amount cannot exceed 75 kWh for each 15 minutes. When the power consumption amount in any period of time segment exceeds the contracted amount, the store has to pay high penalty charge.

The average available power consumption is 5 kWh. However, when the power consumption within one minute is much higher than 5 kWh, it may result in the total power consumption of the time period exceeding 75 kWh even when the power consumption per minute of the following 14 minutes is lower than 5 kWh. The industrial customer found out that it is safer to set a threshold much lower than 5 kWh, such as 4 kWh. Therefore, the initial concept of demand control is derived accordingly. When the power consumption per minute is higher than 4 kWh, the power consumption has to be lowered.

However, the conventional method of demand control is manually setting a fixed amount to be the threshold. It is difficult to decide the amount, and the threshold cannot be adjusted according to practical conditions. When the threshold is too high, the power consumption may exceed the contracted amount, which results in high penalty charge. When the threshold is too low, the system sheds loads continuously, and the store cannot operate normally. Furthermore, even the business places of the same type may have different power consumption when the parameters, such as the location, the season, the number of customers and the floor area, are different. A fixed threshold cannot be applied to each store. When the threshold can not reflect the real timing to reduce power consumption, the following control process does not have much meaning.

SUMMARY OF THE INVENTION

The invention is directed to a method of determining a demand threshold, and a method and a system of demand control. The demand threshold is set according to statistic data by a standard method. An adequate demand threshold is provided according to the place and/or controlled object with different properties. Therefore, the method can be applied more widely.

According to the present invention, a method of calculating a demand threshold is provided. The method includes (a) a control unit arranging demand data in a descending or an ascending order as a curve; (b) the control unit connecting a maximum demand datum and a minimum demand datum with a line; and (c) the control unit setting a demand datum with a longest perpendicular distance to the line as a demand threshold.

According to the present invention, a method of demand control is provided. The method includes (a) a control unit setting a demand threshold, including arranging demand data in a descending or an ascending order as a curve; connecting a maximum demand datum and a minimum demand datum with a line; and setting a demand datum with a longest perpendicular distance to the line as a demand threshold; (b) a measure unit measuring the power consumption at the end of a time unit and calculating the demand of the time segment accordingly; and (c) shutting down an electric apparatus when the calculated demand is greater than the demand threshold.

According to the present invention, a demand control system is provided. The system includes a measure unit and a control unit. The measure unit measures the power consumption at the end of a time unit and calculates a demand of the time segment accordingly. A time segment includes several time units. The control unit calculates a demand threshold according to several demand data. When the calculated demand is greater than the demand threshold, an electric apparatus is shut down.

The invention will become apparent from the following detailed description of the preferred but non-limiting embodiments. The following description is made with reference to the accompanying drawings.

DETAILED DESCRIPTION OF THE INVENTION

The present invention provides a method of determining the demand threshold. The demand threshold is determined according to statistical data objectively. The threshold can be determined properly corresponding to the place or the controlled object of different properties and therefore be applied more widely. The power consumption of a convenient store is illustrated as an example in the following paragraphs. However, one having ordinary skill in the field of the present invention can understand that the method of determining the demand threshold of the present invention is not limited to this application field.

First Embodiment

Figure 1:
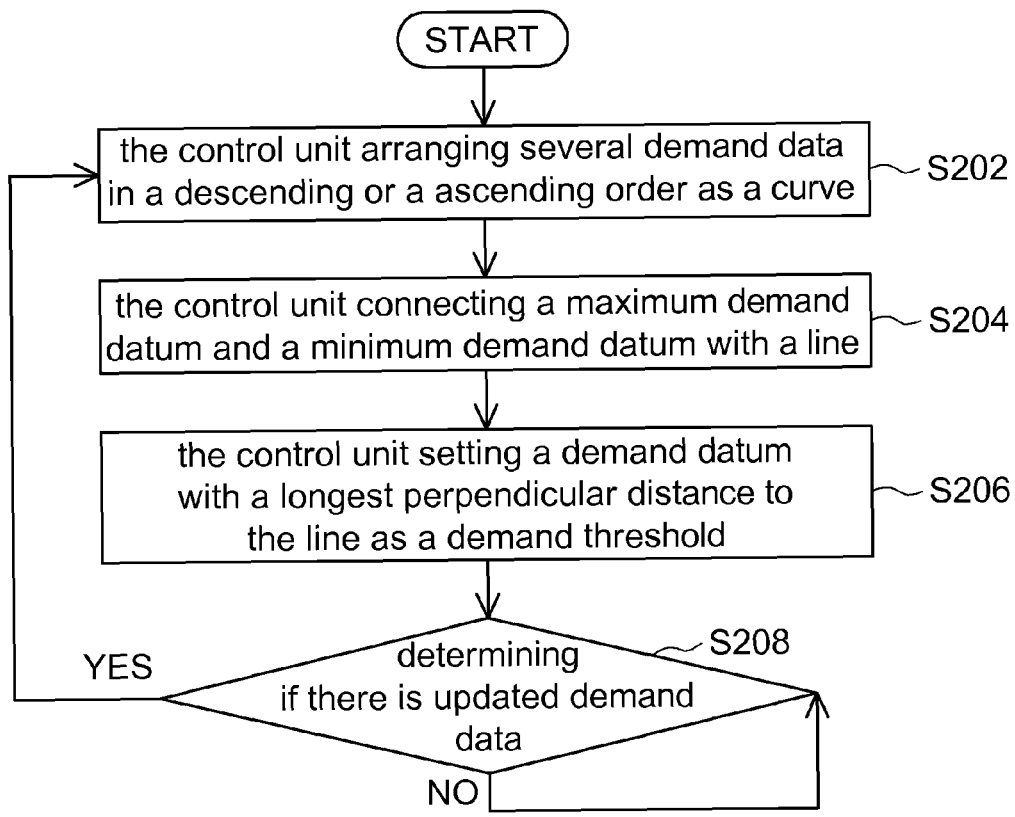
FIG. 1 is a flow chart of a method of determining the demand threshold according to the first embodiment of the present invention.
Figure 2:
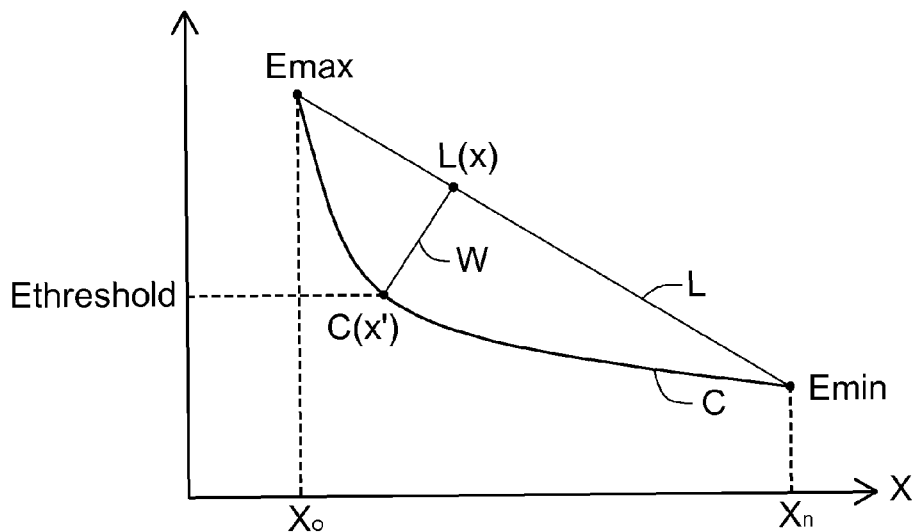
FIG. 2 shows the geometric relation of the determining process of the demand threshold in FIG. 1.
Figure 3:
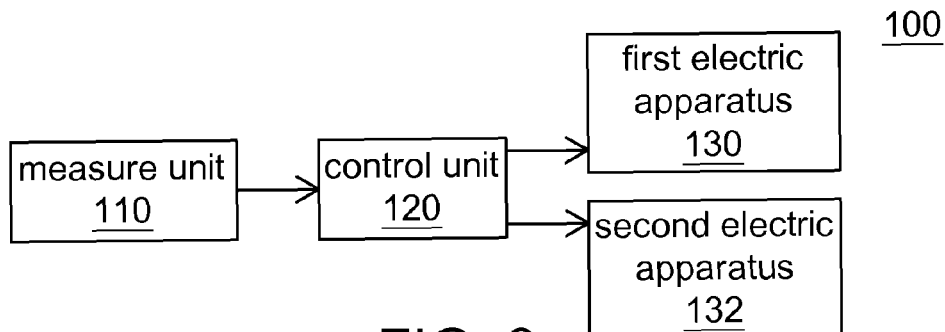
FIG. 3 illustrates a block diagram of a demand control system according to the second embodiment of the present invention.

The present embodiment provides a method of determining a demand threshold. Compared to the conventional demand control method in which an amount is selected to be the demand threshold subjectively, the present embodiment uses a precise algorithm to objectively determine the demand threshold $E_{threshold}$ based on the historical demand data. Please refer to FIG. 1 and FIG. 2. FIG. 1 is a flow chart of a method of determining the demand threshold according to the first embodiment of the present invention. FIG. 2 shows the geometric relation of the determining process of the demand threshold in FIG. 1. First, as shown in the step S202, several demand data $E_1, E_2, E_3 \ldots E_N$ are arranged in a descending or a ascending order as a curve C by a control unit (120 as shown in FIG. 3). The horizontal axis X is a sequence coordinate with equal intervals. Demand data arranged in a descending order as a curve are taken for example in the present embodiment, but it is not limited thereto. The demand data $E_1, E_2, E_3 \ldots E_N$ are original power consumption data without demand control and calculated by an measure unit (130 as shown in FIG. 3). Such data can reflect the required power consumption of the store when the store operates practically. There are many different ways to obtain the demand data. For example, the power consumption of the store is recorded when the store does not apply any control method. Or, a neglecting time in which no control process is performed can be set in each time segment. The power consumption in the neglecting time is used for representing the demand of the whole time segment. In the present preferred embodiment, the demand data of a time period are arranged in a descending order as the curve C. In each time segment (including N time units), the demand data of some time units (n time units; i.e., the neglecting time) are captured to represent the power consumption of the time period. n is not greater than N. For example, a time period is a week, and a time segment is 15 minutes. There are 4×24×7=672 time segments in a time period. A time unit is one minute. Only the power consumption of the neglecting time (e.g., 3 time units) in a time segment (total 15 time units) is recorded, and the average power consumption per minute in the neglecting time is used as a representing demand datum. Therefore, in the present preferred embodiment, the curve C is composed of 672 demand data of time unit. Also, the first three minutes in each time segment are set as the neglecting time. No equipment will be shut down and no control process will be performed even when the power consumption in the neglecting time is high. Therefore, the power consumption in the neglecting time is recorded and just like the actual demand when the store is not under demand control. As a result, the time to collect the demand data is saved, and approximate real-time data can be obtained.

Although the time period, time segment, time unit and the neglecting time are disclosed as above, anyone who has ordinary skill in the field of the present invention understands that the above time parameters are regulatable. Also, the demand data arranged in a descending order as a curve are disclosed as above, but anyone having ordinary skill in the understands that the way to arrange demand data is not limited thereto. The present invention is not limited thereto and changeable corresponding to the applied field and the purpose.

Then, as shown in the step S204, the control unit 120 connect the maximum demand datum $E_{max}$ and the minimum datum $E_{min}$ of the demand data $E_1, E_2, E_3 \ldots E_N$ with a line L. Later, a line segment W perpendicular to the line L is constructed. The intersection point between the line segment W and the curve C is set as $C_{(x)}$. The intersection point between the line segment W and the line L is set as $L_{(x)}$. Therefore, when x is determined, $L_{(x)}$ and $C_{(x)}$ can be obtained. Subsequently, $x_0$ to $x_n$ are substituted for x to obtain the maximum value of $L_{(x)}$-$C_{(x)}$, and $C_{(x)}$ in the equation is the demand threshold. In other words, the perpendicular distance between the demand data $E_1, E_2, E_3 \ldots E_N$ on the curve C and the line L is calculated respectively to find out the demand datum with the maximum perpendicular distance to the line L, and the demand datum is set to be the demand threshold $E_{threshold}$, as shown in the step S206. For example, the demand data $E_1, E_2, E_3 \ldots E_N$ which are in a descending order according to the value representing by the vertical axis are orderly arranged at equal interval along the horizontal axis to form the curve C in FIG. 2. The line L (the line connecting the maximum demand datum $E_{max}$ and the minimum demand datum $E_{min}$) and the curve C only intersect at the maximum demand datum $E_{max}$ and the minimum demand datum $E_{min}$. The line W is constructed perpendicular to the line L. The line W is moved along the entire line L, and the perpendicular distance between each point on the curve C and the line L is calculated to find out the demand datum $C_{(x)}$ with longest perpendicular distance between the curve C and the line L. The demand datum $C_{(x)}$ is set to be the demand threshold $E_{threshold}$.

The method of determining the demand threshold of the present embodiment further includes the step S208 of the control unit 120 checking whether there is updated demand datum or not. If there is, the demand threshold $E_{threshold}$ will be updated accordingly. In the present preferred embodiment, the demand data generated in the 96 time segments during the day and the demand data of the previous 6 days are calculated again at the end of the day by following the steps S202-S206 to obtain a new demand threshold. In other words, the control system updates the demand threshold according to the latest demand data. The present embodiment not only provides a standard method to set the demand threshold but also adjusts the demand threshold according to the present conditions.

Therefore, the demand threshold is set more flexibly and can be applied more widely. However, anyone who has ordinary skill in the field of the present invention can understand that the time interval to update the demand threshold is a changeable parameter depending on the application field and the purpose. The present invention is not limited thereto.

The method of determining the demand threshold of the present invention is disclosed as above. The following paragraphs are about how to apply the above method of determining the demand threshold to the method of demand control.

Second Embodiment

The present embodiment relates to an application of the method of determining the demand threshold, and more particularly to a method and a system of demand control applying the above method of determining the demand threshold. What is worth mentioning is that the control steps can be modified differently, especially about the step of determining whether the power consumption of this time segment will exceed the demand threshold or not and the step of the control strategy if the calculated demand is exceeded demand threshold. The description and drawings disclosed by the present embodiment are only an example under the spirit of the present invention. The present invention is not limited thereto.

FIG. 3 illustrates a block diagram of a demand control system according to the second embodiment of the present invention. Referring to FIG. 3, the demand control system of the present embodiment includes a measure unit 110 and a control unit 120. When a time unit in a time segment ends, the measure unit 110 measures the power consumption in the time unit and then calculates the demand of the time segment according to the measurement. The measure unit 110 is for example a digital electric meter. The control unit 120 is for example a computer or an embedded system. The control unit 120 calculates the demand threshold $E_{threshold}$ according to plenty of demand data of several previous time segments. Also, the control unit 120 determines whether the power demand of that time segment, which is calculated at the end of each time unit ends according to the power consumption is greater or less than the demand threshold $E_{threshold}$. Different control process is performed according to the determined decision.

Figure 4:
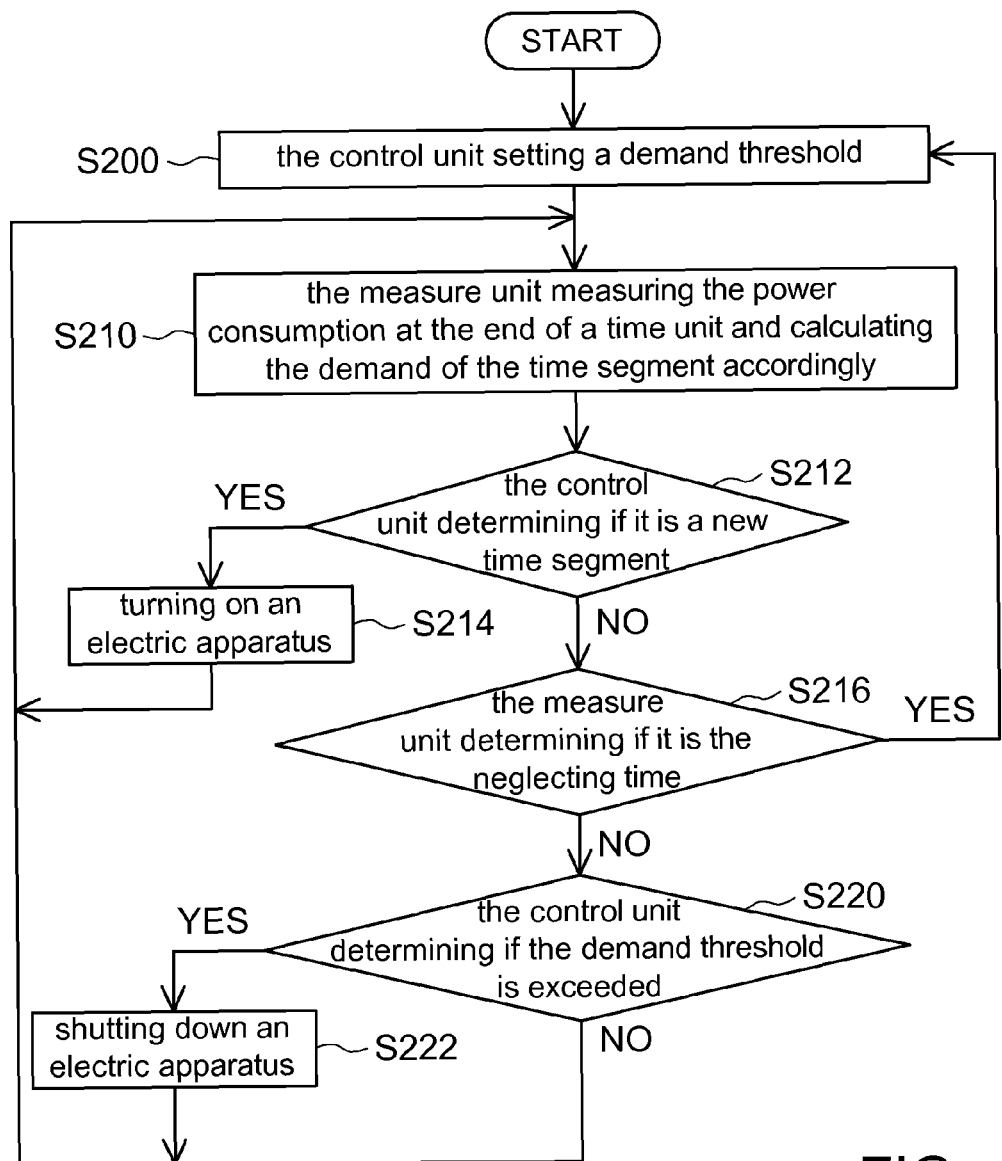
FIG. 4 is a flow chart of the demand control method according to the second embodiment of the present invention.

FIG. 4 is a flow chart of the demand control method according to the second embodiment of the present invention. Please refer to the step S200 in FIG. 4. First, the demand threshold $E_{threshold}$ is determined by the control unit 120. The determining method is disclosed in the above embodiment. After the demand threshold $E_{threshold}$ is determined, as shown in the step S210, the measure unit 110 sums up the power consumption Ez at the end of a time unit. For example, the power consumption is summed up every minute.

The method of demand control of the present embodiment further includes the step S212 of determining if it is the beginning of a time segment. If yes, all electric equipment is turned on.

The method of demand control of the present embodiment further includes the step S216 of the measure unit 110 determining if it is the neglecting time. If yes, the demand datum of the time segment is determined according to the power consumption of the neglecting time, for updating the demand threshold (the step S208 in FIG. 3). When the current time unit is not the neglecting time, as shown in the step S220, the power consumption is measured by the measure unit 110 at the end of the time unit. The demand datum is calculated according to the measured power consumption, and then whether the calculated demand datum exceeds the demand threshold $E_{threshold}$ or not is determined by the control unit 120.

When the calculated demand datum is greater than the demand threshold $E_{threshold}$, as shown in the step S222, the first electric apparatus 130 is shut down. When the above condition is not satisfied, the method goes to the step S210 of the measure unit 110 calculating the power consumption in the next time unit. In other words, when the calculated demand exceeds the demand threshold, the electric apparatus is shut down to lower the total power consumption in the whole time segment. When the calculated demand is less than the demand threshold, keep observing the power consumption in the next time unit without performing any process or restarting any electric apparatus.

In the preferred embodiment, when the calculated demand is greater than the demand threshold again in the same time segment, another electric apparatus is shut down. For example, when the calculated demand $E_4$ of the fourth minute is greater than the demand threshold $E_{threshold}$, the first electric apparatus is shut down. Then, when the demand in the same time segment exceeds the demand threshold again, the second electric apparatus 132 can be shut down to lower down the total power consumption in the whole time segment. In other words, several electric apparatuses to be shut down can be ranked in priority order for maintaining the normal operation of the store. When the demand exceeds the demand threshold several times, the electric apparatuses will be shut down according to the priority order. However, anyone who has ordinary skill in the field of the present invention can understand that the control strategy when the demand threshold is exceeded several times is changeable. The present invention is not limited thereto. Modification can be made according to the application field and the purpose.

The method of determining the demand threshold, and the method and system of demand control disclosed by the above embodiments of the present invention provide a standard method (for example, the steps S202-S206) to calculate the demand threshold. An adequate demand threshold is calculated according to the historical approximate demand. It is avoided that the demand threshold is too high, which results in penalty charge when the power consumption exceeds the contracted amount. It is also avoided that the demand threshold is too low, which results in continuously shutting down electric apparatuses and not being able to operate normally. Furthermore, the calculating method of the demand threshold of the present embodiment can provide adequate demand threshold according to the field/controlled object with different properties and can be applied more widely. Moreover, the demand threshold of the present invention can be adjusted dynamically. The demand threshold is updated every time interval (the step S208) for reflecting the power consumption difference due to the factors such as season or number of customers. As a result, the demand threshold which is controlled accordingly has more flexibility and can be applied more widely.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of determining a demand threshold, the method comprising:

a control unit arranging a plurality of demand datum in a descending or an ascending order represented by a vertical axis at equal intervals along a horizontal axis to form a curve, the demand datum related to a power consumption of an electric apparatus;

the control unit connecting a maximum demand datum and a minimum demand datum of the curve with a straight line, wherein the curve only intersects the straight line at the maximum demand datum and the minimum demand datum;

the control unit constructing and moving a perpendicular line along an entire distance of the straight line, wherein a perpendicular distance between each point on the straight line and curve is calculated to determine the perpendicular line of a longest perpendicular distance between the straight line and the curve, the control unit setting the demand threshold as the perpendicular line of the longest perpendicular distance between the straight line and the curve;

a measuring unit measuring the demand datum related to the power consumption of the electric apparatus at an end of a time unit of a time segment, and calculating a demand of the time segment according to the measured power consumption; and shutting down the electric apparatus when the calculated demand is greater than the demand threshold.

2. The method according to claim 1 further comprising:
the control unit checking if there is updated demand datum; and
if yes, updating the demand threshold accordingly.

3. The method according to claim 1, further comprising:
the measure unit measuring a power consumption at an end of another time unit in the time segment, and calculating another demand of the time segment according to the measured power consumption; and
shutting down another electric apparatus when the calculated demand exceeds the demand threshold.

4. The method according to claim 1, further comprising;
turning on the electric apparatus at a beginning of a time segment.

5. The method according to claim 1, wherein the time segment comprises N time units, a neglecting time comprises n time units, $n \leq N$, and the method further comprises:

the measure unit determining if it is the neglecting time; and
if yes, the measure unit defining a demand according to a power consumption of the neglecting time.

6. A demand control system, comprising:
a measure unit, measuring a power consumption at an end of a time unit and calculating a demand data of a time segment accordingly, wherein the time segment comprises a plurality of time units; and a control unit, calculating a demand threshold according to a plurality of demand data, and shutting down an electric apparatus when the demand is greater than the demand threshold;

wherein the demand threshold is updated by the control unit based on a power consumption of a neglecting time in the time segment, the neglecting time including at least one of the time units; and a power consumption of one of the time units, which is not in the neglecting time, is measured by the measure unit for calculating the demand data;

the control unit arranging a plurality of demand datum in a descending or an ascending order represented by a vertical axis at equal intervals along a horizontal axis to form a curve, the demand datum related to the power consumption of the electric apparatus;

the control unit connecting a maximum demand datum and a minimum demand datum of the curve with a straight line, wherein the curve only intersects the straight line at the maximum demand datum and the minimum demand datum;

the control unit constructing and moving a perpendicular line along an entire distance of the straight line, wherein a perpendicular distance between each point on the straight line and curve is calculated to determine the perpendicular line of a longest perpendicular distance between the straight line and the curve, and the control unit setting the demand threshold as the perpendicular line of the longest perpendicular distance between the straight line and the curve.

* * * * *